Oct. 24, 1961 E. J. H. FIALA 3,005,641
SUSPENSION MECHANISM FOR VEHICLES
Filed Oct. 1, 1957
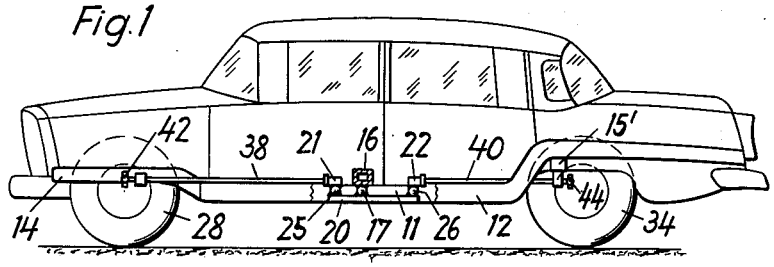
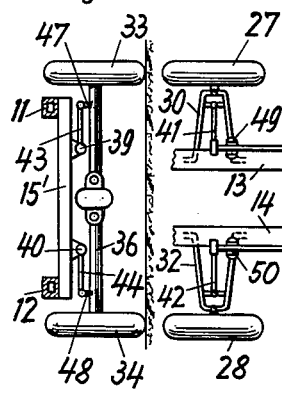
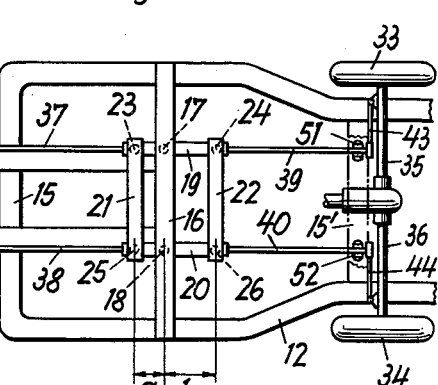
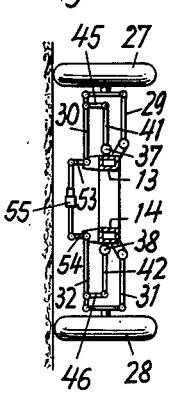
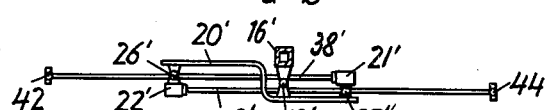
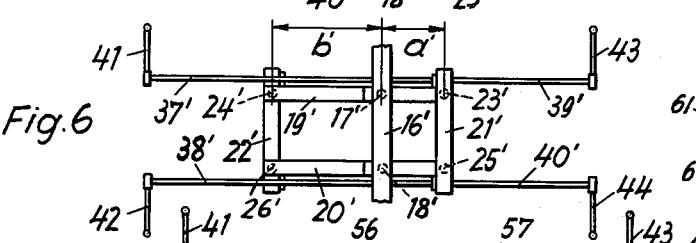
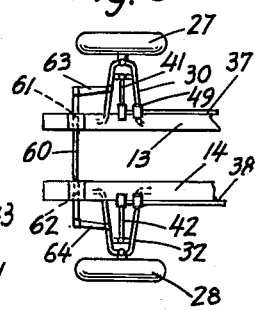
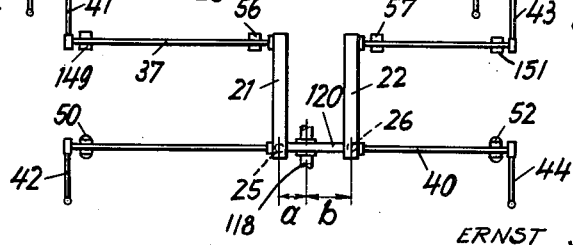
INVENTOR
ERNST J. H. FIALA
BY Dicke and Bray
ATTORNEYS.

United States Patent Office  3,005,641
Patented Oct. 24, 1961

3,005,641
SUSPENSION MECHANISM FOR VEHICLES
Ernst J. H. Fiala, Sindelfingen, Kreis Boeblingen, Germany, assignor to Daimler-Benz Aktiengesellschaft, Stuttgart-Untertürkheim, Germany
Filed Oct. 1, 1957, Ser. No. 687,517
Claims priority, application Germany Oct. 4, 1956
13 Claims. (Cl. 280—104)

The present invention relates to new improvements in wheel suspension systems for vehicles, and particularly automobiles and the like.

The principal object of the present invention is to provide a wheel suspension system which prevents the torsional stresses produced by the vertical movements of each wheel of a vehicle from being transmitted to the frame or body of the vehicle.

Another object of the present invention is to provide a wheel suspension system in which the vertical movements of the four wheels of a vehicle compensate each other so that at a vertical movement of one wheel the diagonally opposite wheel will carry out a similar movement in the same direction, while the other two wheels carry out a similar movement but in the opposite direction.

A principal feature of the invention for attaining the above-mentioned objects consists in the provision of a wheel suspension in which each wheel of a vehicle is operatively associated with a torsion bar which extends substantially in the longitudinal direction of the vehicle and is mounted on the frame or body of the vehicle, and which is turned by means of a lever arm on such torsion bar which follows the vertical movements of the respective wheel.

Another feature of the invention resides in providing a compensating frame consisting of at least one longitudinal arm and two cross arms which are pivotably connected to each other and at least one longitudinal arm which is pivotably mounted on the frame or body of the vehicle, and in rigidly connecting each of the two torsion bars which are associated with the front wheels or the rear wheels, respectively, to one of the two cross arms of the compensating frame.

Another object of the invention is to provide a wheel suspension of the mentioned type which has the advantage of requiring very little space and only a few pivotal joints, and which may be produced at a low cost, is very safe in operation, and requires very little service.

Another important object of the invention consists in utilizing the bars which serve to transmit the compensating movements also for resiliently taking up and absorbing the vertical movements of the wheels by making them in the form of torsion springs. By providing such torsion-bar springs, the great advantage is attained that special wheel springs may either be omitted entirely or only be required to be of a relatively small size and strength. In the event that the length of the bars should not be sufficient to attain the desired resiliency, the suspension system may be easily modified so that the cross arm of the compensating frame which is associated with the rear wheels will be mounted further toward the front of the vehicle than the cross arm which is associated with the front wheels.

The present invention has the further advantage that by properly selecting the position of the pivotal points of the longitudinal arms of the compensating frame within the longitudinal extent of these arms, it is possible to shift the load distribution upon the individual wheels at one side of the vehicle so as to compensate for the additional load or load reduction produced when the vehicle is driven along a curve. It is thus possible to increase or reduce the effect of the "underriding" or "overriding" of a car in a curve.

The compensating frame according to the present invention may also be provided with only one longitudinal arm. Such arm may then be mounted so as to lie substantially in alignment with the two torsion bars for the wheels of one side of the vehicle, and each of these bars may then be supported on the frame or body of the vehicle at only one point, preferably near the respective wheel, while each of the bars at the other side of the vehicle may be supported on the vehicle frame or body at two different points, preferably near the respective wheel and near the cross arms of the compensating frame. Although such a compensating frame is not completely symmetrical, it has the advantage that one entire arm may be omitted.

Further objects, features, and advantages of the present invention will be apparent from the following detailed description thereof, particularly when read with reference to the accompanying drawings in which—

FIG. 1 illustrates a side view of a wheel suspension system according to the invention on a compensating frame with four arms;

FIG. 2 illustrates a plan view thereof;
FIG. 3 illustrates a front view thereof;
FIG. 4 illustrates a rear view thereof;
FIG. 5 illustrates a side view of a modification of the invention as shown in FIGS. 1 to 4;
FIG. 6 illustrates a plan view of the modification as illustrated in FIG. 5;
FIG. 7 illustrates a plan view of another modification of the invention with a compensating frame with only three arms, while
FIGURE 8 illustrates a plan view of another modification utilizing an auxiliary bar stabilizer.

Referring to the drawings, and first particularly to FIGS. 1 to 4, the main frame of the motor vehicle to which the invention may be applied consists essentially of two outer frame side members 11 and 12, two front side members 13 and 14 which are disposed inwardly of side members 11 and 12, and cross members 15, 16, and 15'. Cross member 16 supports the two longitudinal arms 19 and 20 of the compensating frame which are pivotably mounted thereon by means of two ball-and-socket joints 17 and 18. Cross arms 21 and 22 of this compensating frame are connected to longitudinal arms 19 and 20 by means of ball-and-socket joints 23, 24, 25, and 26, respectively. These joints 23 to 26 are designed so as to permit not only rotary movements but to a limited extent also shifting movements of the respective arms relative to each other. This may be achieved by any suitable means, known as such, for example, by rubber bearings (not shown).

Front wheels 27 and 28 are mounted on frame members 13 and 14 by means of two pairs of arms 29, 30 and 31, 32, respectively, while rear wheels 33 and 34 are mounted on swinging half-axles 35 and 36, respectively.

The wheel suspension system according to the present invention further comprises torsion-bar springs 37 to 40 which extend in the longitudinal direction of the vehicle and terminate at their ends facing toward the wheels in lever arms 41 to 44, respectively, which are connected by means of short intermediate arms 45 to 48 to arms 30 and 32 and half-axles 35 and 36, respectively. The inner ends of torsion bars 37 to 40 are rigidly secured to cross arms 21 and 22, respectively of the compensating frame.

Furthermore, torsion bars 37 to 40 are pivotably mounted on the main frame members 13, 14, and 15' near the four wheels by means of bearings 49 to 52 which are designed to permit a limited pivotal movement of the torsion bars and may be suspended in rubber or the like similarly as joints 23 to 26.

Arms 30 and 32 terminate in lever arms 53 and 54, respectively, which are pivotally connected to each other by means of a pair of rods which terminate in a telescopic shock absorber 55.

It will thus be evident that the wheel suspension system according to the invention is one in which the vertical movements of one wheel will be transmitted to all of the other wheels. Assuming, for example, that the left front wheel 28 runs over a rock, it will move together with its arms 31 and 32 in an upward direction toward the main frame. This movement will be transmitted through lever arm 42 to torsion spring 38 which, in turn, exerts a torque in a clockwise direction, as seen in the forward direction of the vehicle, upon cross arm 21 of the compensating frame which is rigidly connected to spring 38. Joint 25 will therefore move upwardly and joint 23 accordingly downwardly. Since longitudinal arms 19 and 20 are pivotably mounted on the rigid cross member 16 by joints 17 and 18, such displacement of joints 23 and 25 results in an upward movement of joint 24 and a downward movement of joint 26. Such distortion of the compensating frame, in turn, results in a downward movement of lever arm 41, an upward movement of lever arm 43, and a downward movement of lever arm 44, and in corresponding movements of the respective wheels.

One very important feature of the wheel suspension system according to the invention is the fact that, since equally directed movements of the wheels which are disposed in a diagonal relation to each other will be taken up by a distortion of the compensating frame, such movements will not exert any distorting effect upon the actual vehicle frame so that the usual "shaking" of the vehicle will be almost entirely avoided. This shaking movement of conventional wheel suspensions was caused by the torsional vibrations of the vehicle body about its longitudinal axis which usually occur at a frequency of 12 to 18 cycles and wtihout reaching very large amplitudes.

It is therefore in many cases sufficient if the amplitude of the oscillations of the compensating frame is limited by means of stops so that the shaking vibrations will then be taken up by the compensating frame, while the stronger vertical movements will be transmitted in the usual manner to the vehicle frame. The use of such stops has the advantage that, because of the relatively small distortions of the compensating frame, the joints thereof may be made in the form of simple ball-and-socket joints wherein one or the other part of each joint merely has to be secured to the respective arm by a slightly resilient connection, for example, by interposing a rubber layer.

In some cases it may also be advisable to interpose damping devices between the arms of the compensating frame or the compensating frame as such and the main frame or body of the vehicle.

The wheel suspension system according to the present invention is relatively resistant against pivotal movements about the transverse axis of the vehicle caused by braking or deceleration of the vehicle since, at a vertical movement, for example of both front wheels 27 and 28 or of both rear wheels 33 and 34 in the same direction, the compensating frame will not be moved at all and the movement will be resiliently taken up and absorbed solely by the two torsion springs 37 and 38 or 39 and 40, respectively. If such equally directed vertical movements of the front wheels occur, the shock absorber 55 will also become effective, as may be easily seen in FIG. 3. If the two front wheels should, however, move in opposite vertical directions, the two main elements of this telescopic shock absorber 55 will practically not move at all relative to each other. Although not particularly shown in the drawings, the rear wheels 33 and 34 may also be provided with a shock absorber in a similar manner.

Another possibility of mounting the shock absorbers for the wheels so as to prevent any direct reaction upon the main vehicle frame consists in interposing them between the wheels and the compensating frame. In this event, the torsion bars may be enclosed by torsion-resistant tubes which are rigidly connected at one of their ends to one of the cross arms of the compensating frame, while the other ends thereof act upon the shock absorber.

When a car travels along a curve, the centrifugal force then occurring produces an additional load upon the wheels facing toward the outside of the curve and a corresponding reduction in the load upon the wheels facing toward the inside of the curve. By selecting a proper relation between the two distances $a$ and $b$, as shown in FIG. 2, between joints 23, 25 and 17, 18, on the one hand, and joints 24, 26 and 17, 18, on the other hand, it is easily possible to distribute the additional curve load and load reduction to an increased extent either upon the front wheels or the rear wheels, and thus to influence the road-holding properties of the car within the curve, that is, the properties usually called "overriding" or "underriding" of a car. In the example as illustrated, the load and load reduction of the front wheels in the relation of $b$ to $a$ would be greater than the corresponding load and load reduction of the rear wheels, so that the car would have the tendency to "underride."

If the length of torsion springs 37 to 40 should not be sufficient to attain the desired resilient effect, the wheel suspension system may be modified in the manner as illustrated in FIGS. 5 and 6 in which the order of succession of the cross arms 21 and 22 of the compensating frame has been reversed with respect to the showing of the species of FIGURES 1 to 4, inclusive. In the species of FIGURES 5 and 6, these cross arms are spaced greater distances $b'$, $a'$ from the cross member 16' than the distances $b$, $a$ spacing the corresponding members of the species of FIGURES 1 to 4, the cross arm 22' associated with the rear wheels being displaced further toward the front of the vehicle than cross arm 21' associated with the front wheels. The forward ends of the arms 19' and 20' are superposed on cross arm 22', being pivotally connected thereto by ball and socket joints 24' and 26'. These arms are downwardly bent so as to pass beneath the cross member 16 to which they are pivotally connected by the ball and socket joints 17' and 18'. The arms 19' and 20' are also connected to cross arm 21' by the ball and socket joints 23' and 25'. The torsion bars 37', 38' secured to cross arm 21', and bars 39', 40' secured to cross arm 22', are of such a length as to extend on both sides of cross member 16' instead of terminating short thereof as in the case of the corresponding members of the species of FIGURES 1 to 4, inclusive. Reference numerals 41, 42, 43, 44, as in FIGURES 1 to 4, inclusive, indicate the wheel lever arms. The frame is therefore inverted, so to speak, relative to its design as illustrated in FIGS. 1 to 4. The operation or action thereof remains, however, unchanged. A car of a type according to FIGS. 5 and 6 would therefore also have the tendency to "underride" in a curve.

FIG. 7 finally illustrates an embodiment of the invention in which the compensating frame only has a single longitudinal arm 120 which is pivotably mounted on an axis 118 which is rigidly secured to the vehicle. Torsion bars 37 and 39 may then be rigidly supported at two points, that is, by bearings 149 and 56, and 151 and 57, respectively. However, in this case it would be necessary that the bearings 50 and 52 and joints 25 and 26 will be resilient and permit certain sliding movements.

FIGURE 8 shows a construction with an auxiliary torsion bar stabilizer 60 mounted on the front side members 13 and 14 at points 61 and 62, and carrying at its ends the lever arms 63, 64 which engage, either directly or indirectly, the arms 30 or 32 of the wheel suspension.

Although my invention has been illustrated and described with reference to the preferred embodiments thereof, I wish to have it understood that it is in no way limited to the details of such embodiments but is capable of numerous modifications within the scope of the appended claims. Thus, for example, additional torsion bars may, for reasons of better stabilization, be provided between the two front or rear wheels or between two wheels which are disposed in a diagonal relation to each other. Furthermore, for influencing the torsional resistance of the compensating frame, the arms thereof may also be connected to each other by additional resilient elements or they may themselves be made resilient.

Having thus fully disclosed my invention, what I claim is:

1. A wheel suspension for a vehicle having a frame and front and rear wheels, comprising torsion bars operatively associated with each of said wheels and extending substantially in the longitudinal direction of said vehicle, means for pivotably mounting each of said torsion bars on said frame, each of said torsion bars terminating at one end in a lever arm connected to one of said wheels so as to transmit the vertical movements of said wheel to one of said torsion bars to turn the same, a compensating frame comprising at least one longitudinal arm and two cross arms, means for pivotably connecting said longitudinal arm to said two cross arms, and means for pivotably mounting at least said one longitudinal arm on said vehicle frame, each of said torsion bars of said front wheels being rigidly secured to one of said cross arms, and each of said torsion bars of said rear wheels being rigidly secured to the other cross arm.

2. A wheel suspension as defined in claim 1, wherein said means for pivotably connecting said compensating frame to said vehicle frame and said means for pivotably connecting said longitudinal arm to said two cross arms are resilient.

3. A wheel suspension as defined in claim 1, wherein said means for pivotably mounting each of said torsion bars on said frame are disposed in proximity to one each said end, each of said last-named means being mounted at a single point on said frame.

4. A wheel suspension as defined in claim 1, wherein said means for pivotably mounting at least said one longitudinal arm of said compensating frame on said vehicle frame are disposed so as to divide said arm into two parts of different lengths.

5. A wheel suspension as defined in claim 1, wherein said cross arm of said compensating frame which is operatively associated with said rear wheels is disposed further toward the front of said vehicle than said cross arm which is operatively associated with said front wheels.

6. A wheel suspension as defined in claim 1, wherein said compensating frame has only one longitudinal arm extending substantially in alignment with the two torsion bars for the wheels at one side of the vehicle, further comprising means for mounting each of said two torsion bars at only one point on said vehicle frame near the respective wheel at said vehicle side, and means for mounting each of the two torsion bars at the other side of said vehicle at two different points on said vehicle frame near the respective wheel at said other vehicle side and near said cross arms of said compensating frame.

7. A wheel suspension for a vehicle having a frame and front and rear wheels, comprising torsion bars extending substantially in the longitudinal direction of the vehicle, means for pivotally mounting each of said torsion bars on said frame, each one of said torsion bars having a lever arm operatively connected to one of said wheels for transmitting the vertical movements of said one of said wheels to twist said one of said torsion bars, a compensating frame comprising at least one longitudinal arm and two cross arms, means for pivotally connecting said longitudinal arm to said two cross arms, means for pivotally connecting said compensating frame to said vehicle frame, and each of said torsion bars having a rigid connection with said compensating frame.

8. A wheel suspension for a motor vehicle according to claim 7, wherein said means for pivotally connecting said compensating frame to said vehicle frame comprises a pivotal connection between said one longitudinal arm and said frame.

9. A wheel suspension for a vehicle according to claim 7, wherein said rigid connection of each of said torsion bars operatively connected to said rear wheels is made with one of said cross arms and said rigid connection of each of said torsion bars operatively connected to said front wheels is made with the other of said cross arms, said one of said cross arms being disposed further toward the front of said vehicle than the said other of said cross arms.

10. A wheel suspension according to claim 7, wherein said rigid connection of each of said torsion bars operatively connected to said rear wheels is made with one of said cross arms and said rigid connection of each of said torsion bars operatively connected to said front wheels is made with the other of said cross arms, said one of said cross arms being disposed further toward the rear of said vehicle than the said other of said cross arms.

11. A wheel suspension according to claim 7, wherein said one longitudinal arm is in substantial alignment with two of said torsion bars operatively connected with the wheels on one side of said vehicle.

12. A wheel suspension according to claim 7, wherein said one longitudinal arm is disposed below the level of said torsion bars.

13. A wheel suspension for a vehicle having a frame and front and rear wheels, comprising torsion bars operatively associated with each of said wheels and extending substantially in the longitudinal direction of said vehicle, means for pivotably mounting each of said torsion bars on said frame, each of said torsion bars terminating at one end in a lever arm connected to one of said wheels so as to transmit the vertical movements of said wheel to one of said torsion bars to turn the same, a compensating frame having a plurality of relatively movable interconnected parts comprising at least three arm means, two of said three arm means being approximately parallel, pivotal means interconnecting the third of said three arm means with said two of said three arm means, means for mounting at least one of said two arm means on said vehicle frame, each of said torsion bars of said front wheels being rigidly connected to one of said parts, each of said torsion bars of said rear wheels being rigidly connected to another of said parts.

References Cited in the file of this patent

UNITED STATES PATENTS

| 1,868,258 | Schieferstein | July 19, 1932 |
| 2,099,819 | Mercier | Nov. 23, 1937 |
| 2,416,388 | Hendrix | Feb. 25, 1947 |

FOREIGN PATENTS

| 879,576 | France | Nov. 30, 1942 |
| 529,739 | Great Britain | Nov. 27, 1940 |